(12) United States Patent
Hirose et al.

(10) Patent No.: US 8,940,441 B2
(45) Date of Patent: Jan. 27, 2015

(54) ANODE AND BATTERY

(75) Inventors: Takakazu Hirose, Fukushima (JP);
Kenichi Kawase, Fukushima (JP);
Isamu Konishiike, Fukushima (JP);
Masayuki Iwama, Fukushima (JP);
Koichi Matsumoto, Fukushima (JP)

(73) Assignee: Sony Corporatin, Tokyo (JP)

( * ) Notice: Subject to any disclaimer, the term of this patent is extended or adjusted under 35 U.S.C. 154(b) by 1375 days.

(21) Appl. No.: 11/695,952

(22) Filed: Apr. 3, 2007

(65) Prior Publication Data

US 2008/0176133 A1 Jul. 24, 2008

(30) Foreign Application Priority Data

Apr. 4, 2006 (JP) ................. P2006-102814

(51) Int. Cl.
*H01M 4/74* (2006.01)
*H01M 4/58* (2010.01)

(52) U.S. Cl.
USPC ....................... 429/241; 429/218.1

(58) Field of Classification Search
CPC ....... H01M 4/13; H01M 4/742; H01M 4/134; H01M 4/386
USPC .............. 429/164, 209, 218.1, 241
See application file for complete search history.

(56) References Cited

U.S. PATENT DOCUMENTS

| | | | | |
|---|---|---|---|---|
| 6,051,340 A | * | 4/2000 | Kawakami et al. | 429/231.95 |
| 6,287,720 B1 | * | 9/2001 | Yamashita et al. | 429/131 |
| 6,413,672 B1 | * | 7/2002 | Suzuki et al. | 429/231.95 |
| 6,432,579 B1 | | 8/2002 | Tsuji et al. | |

FOREIGN PATENT DOCUMENTS

| | | | |
|---|---|---|---|
| EP | 1 137 088 | * | 9/2001 |
| JP | 08-050922 | | 2/1996 |
| JP | 2948205 | | 2/1999 |
| JP | 11-135115 | | 5/1999 |
| JP | 2001006749 | * | 1/2001 |
| JP | 2003-017040 | | 1/2003 |
| JP | 2003-017069 | | 1/2003 |
| JP | 2005-190772 | | 7/2005 |
| JP | 2006-202680 | * | 8/2006 |

OTHER PUBLICATIONS

Japanese Office Action issued on Dec. 7, 2011 in connection with counterpart JP Application No. JP2006-102814.

* cited by examiner

*Primary Examiner* — Ula C. Ruddock
*Assistant Examiner* — Thomas H. Parsons
(74) *Attorney, Agent, or Firm* — Dentons US LLP

(57) ABSTRACT

An anode capable of relaxing the stress due to expansion and shrinkage and a battery using the anode are provided. In the anode, an anode active material layer containing at least one of silicon and tin as an element is provided on both faces of a strip-shaped anode current collector. In the anode current collector and the anode active material layer, at least one penetrating portion that is cut out or slit to penetrate the anode current collector and the anode active material layer is formed to extend to include a longitudinal component of the anode current collector.

19 Claims, 6 Drawing Sheets

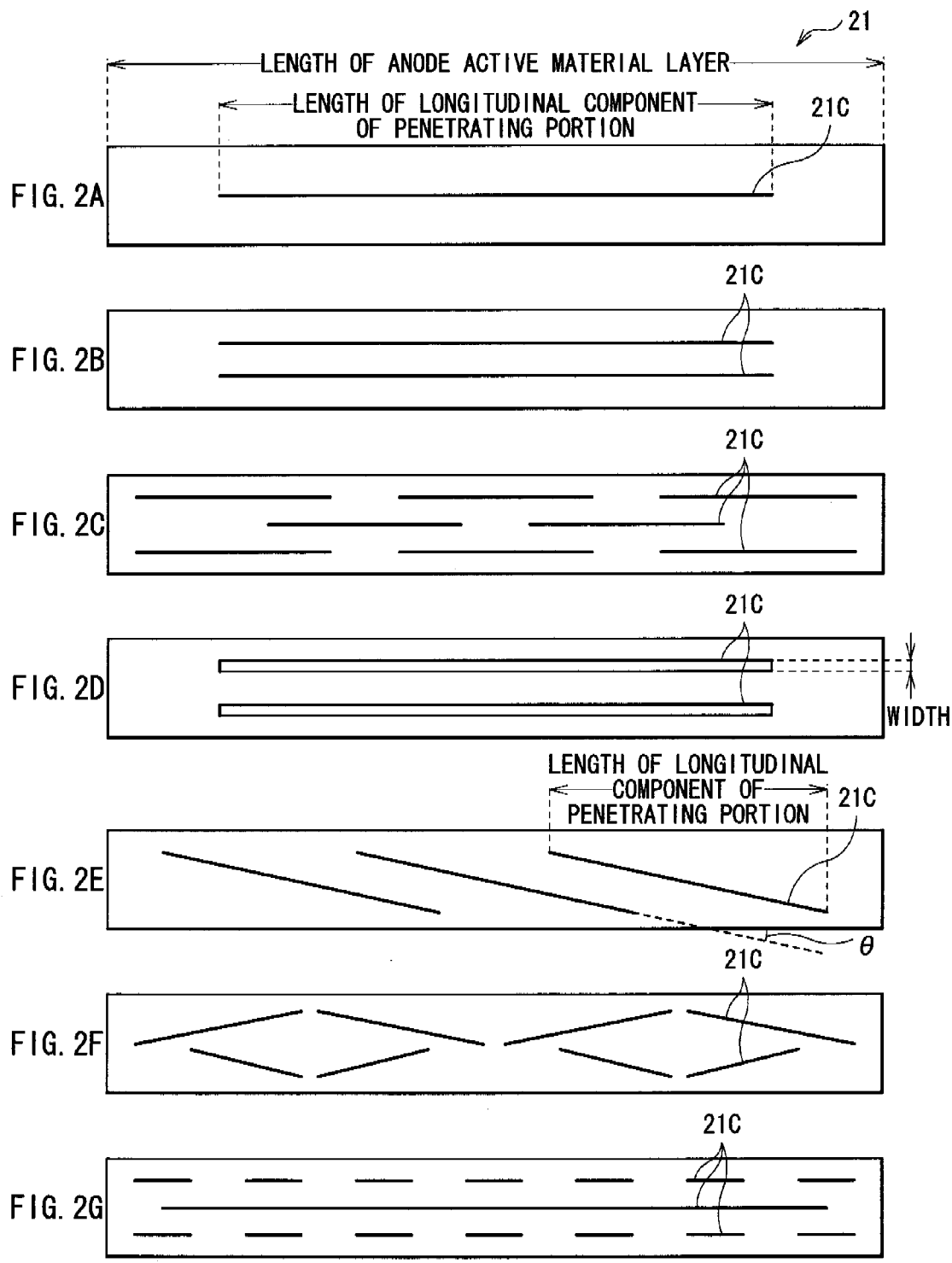

ANODE AND BATTERY

CROSS REFERENCES TO RELATED APPLICATIONS

The present invention contains subject matter related to Japanese Patent Application JP 2006-102814 filed in the Japanese Patent Office on Apr. 4, 2006, the entire contents of which being incorporated herein by reference.

BACKGROUND OF THE INVENTION

1. Field of the Invention

The present invention relates to an anode containing at least one of silicon (Si) and tin (Sn) as an element and a battery using the anode.

2. Description of the Related Art

In recent years, as mobile devices have been sophisticated and multi-functionalized, the higher capacity of secondary batteries as a power source for these mobile devices has been demanded. As a secondary battery to meet such a demand, there is a lithium ion secondary battery. However, since graphite is used for the anode in the lithium ion secondary battery in practical use currently, the battery capacity thereof is in a saturated state and thus it is difficult to attain a vastly high capacity thereof. Therefore, it is considered to use silicon, tin or the like for the anode. In recent years, forming an anode active material layer on an anode current collector by vapor-phase deposition method or the like has been reported (for example, refer to Japanese Unexamined Patent Application Publication Nos. 8-50922 and 11-135115, and Japanese Patent Publication No. 2948205).

However, silicon or tin is largely expanded and shrunk due to charge and discharge. Thus, there has been disadvantages as follows. That is, for example, the anode active material layer is dropped, and the cycle characteristics are lowered. Further, the anode current collector is deformed and the wrinkles are generated in the anode, and thus the battery is swollen. Therefore, it is considered that by forming a groove in the anode active material layer or by forming a slit in the anode current collector, the stress due to the expansion and shrinkage is relaxed and the characteristics are improved (for example, refer to Japanese Unexamined Patent Application Publication Nos. 2003-17040 and 2003-17069).

SUMMARY OF THE INVENTION

However, in the method of forming the groove in the anode active material layer, the capacity is lowered if trying to obtain sufficient effects. In the method of forming a slit in the anode current collector, it is difficult to obtain the uniform film thickness of the anode active material layer, precipitation of lithium (Li) or the like is caused, and sufficient cycle characteristics are not able to be obtained.

In view of the foregoing, in the invention, it is desirable to provide an anode capable of relaxing the stress due to the expansion and shrinkage and a battery using the anode.

According to an embodiment of the invention, there is provided an anode in which an anode active material layer containing at least one of silicon and tin as an element is provided on both faces of a strip-shaped anode current collector, wherein in the anode current collector and the anode active material layer, at least one penetrating portion that is cut out or slit to penetrate the anode current collector and the anode active material layer is formed to extend to include a longitudinal composition of the anode current collector.

According to an embodiment of the invention, there is provided a battery including a cathode, an anode, and an electrolyte, wherein the anode has a strip-shaped anode current collector and an anode active material layer that is provided on both faces of the anode current collector and contains at least one of silicon and tin as an element, and in the anode current collector and the anode active material layer, at least one penetrating portion that is cut out or slit to penetrate the anode current collector and the anode active material layer is formed to extend to include a longitudinal component of the anode current collector.

According to the anode of the embodiment of the invention, the penetrating portion that is cut out or slit to penetrate the anode current collector and the anode active material layer is formed to extend to include a longitudinal component of the anode current collector. Therefore, the stress on the anode current collector due to expansion and shrinkage of the anode active material layer is relaxed, and wrinkles can be prevented from being generated. In the result, separation of the anode active material layer and increase of the thickness of the anode can be prevented. Therefore, according to the battery of the embodiment of the invention using such an anode, the battery characteristics such as cycle characteristics can be improved, and the battery can be prevented from being swollen.

In particular, when the extension direction of the penetrating portion is parallel to the longitudinal direction of the anode current collector, when the angle made by the extension direction of the penetrating portion and the longitudinal direction of the anode current collector is 60 deg or less, when one length in the longitudinal component of the penetrating portion is 25% or more of the length of the anode active material layer, preferably 50% or more thereof, and much more preferably 70% or more, when the plurality of penetrating portions are provided, or when the width of the penetrating portion is from 0.1 mm to 5 mm, higher effects can be obtained.

Other and further objects, features and advantages of the invention will appear more fully from the following description.

BRIEF DESCRIPTION OF THE DRAWINGS

FIGS. 2A to 2G are plan views showing an expanded state of an anode shown in FIG. 1;

DETAILED DESCRIPTION OF THE PREFERRED EMBODIMENTS

Embodiments of the invention will be hereinafter described in detail with reference to the drawings.

First Embodiment

Figure 1:
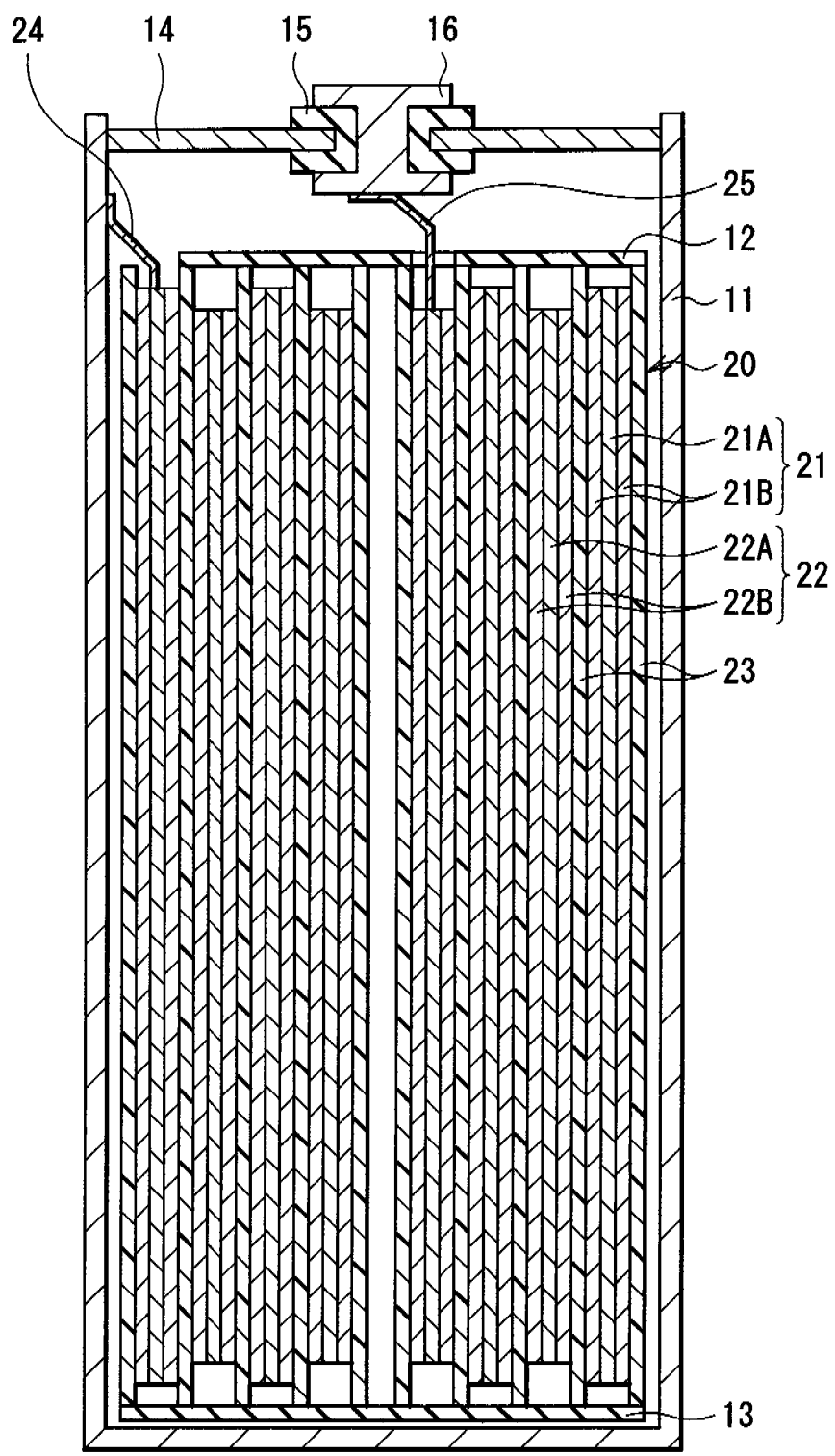
FIG. 1 is a cross section showing a structure of a secondary battery according to a first embodiment of the invention.

FIG. 1 shows a structure of a secondary battery according to a first embodiment of the invention. The secondary battery is a so-called square type battery, and has a battery element 20 inside a battery can 11 in the shape of an approximately hollow cylinder. The battery can 11 is a metal container, and is made of, for example, aluminum (Al), an aluminum alloy, nickel (Ni), a nickel alloy, iron (Fe), or an iron alloy. The surface of the battery can 11 may be plated, or coated with a resin or the like. Inside the battery can 11, a pair of insulating plates 12 and 13 is arranged so that the battery element 20 is sandwiched between the insulating plates 12 and 13. One end of the battery can 11 is closed, and the other end thereof is opened. The open end of the battery can 11 is sealed with a battery cover 14. A terminal pin 16 is provided in the battery cover 14 with an insulating member 15 in between. The battery cover 14 and the terminal pin 16 are made of, for example, a metal material similar to that of the battery can 11.

The battery element 20 has a structure in which, for example, a strip-shaped anode 21 and a strip-shaped cathode 22 are layered with a separator 23 in between and spirally wound several times in the oval shape or the flat shape in the longitudinal direction. An anode lead 24 made of nickel or the like is connected to the anode 21, and a cathode lead 25 made of aluminum or the like is connected to the cathode 22. The anode lead 24 is electrically connected to the battery can 11, and the cathode lead 25 is electrically connected to the terminal pin 16.

The anode 21 has, for example, a strip-shaped anode current collector 21A and a strip-shaped anode active material layer 21B provided on the both faces of the anode current collector 21A. The anode active material layer 21B may be provided on the whole area or part of the anode current collector 21A. Further, the region provided with the anode active material layer 21B on one face of the anode current collector 21A may or may not correspond with the region provided with the anode active material layer 21B on the other face of the anode current collector 21A. Furthermore, the region where the anode active material layer 21B is provided only on one face of the anode current collector 21A may exist.

The anode current collector 21A is preferably made of a metal material containing at least one metal element not forming an intermetallic compound with lithium. When an intermetallic compound is formed with lithium, the anode is expanded and shrunk due to charge and discharge, structural fracture occurs, and collectivity is lowered. In addition, the ability to support the anode active material layer 21B becomes lowered. In this specification, the metal materials include an alloy including two or more metal elements or an alloy including one or more metal elements and one or more metalloid elements, in addition to simple substances of metal elements. As a metal element not forming an intermetallic compound with lithium, for example, copper (Cu), nickel, titanium (Ti), iron, or chromium (Cr) can be cited.

The anode current collector 21A preferably contains a metal element being alloyed with the anode active material layer 21B. Thereby, the contact characteristics between the anode active material layer 21B and the anode current collector 21A can be improved. As a metal element not forming an intermetallic compound with lithium and being alloyed with the anode active material layer 21B, in the case that the anode active material layer 21B contains silicon or tin as an element as described later, for example, copper, nickel, or iron can be cited. Such an element is preferable in terms of the strength and the conductivity.

The anode current collector 21A may be formed of a single layer or a plurality of layers. In the latter case, the layer contacting with the anode active material layer 21B may be made of a metal material being alloyed with silicon, and other layers may be made of other metal material.

The surface of the anode current collector 21A is preferably roughened. The surface roughness Ra is preferably 0.1 μm or more, and more preferably 0.2 μm or more. Thereby, the contact characteristics between the anode active material layer 21B and the anode current collector 21A can be further improved. The surface roughness Ra of the anode current collector 21A is preferably 3.5 μm or less, and more preferably 3.0 μm or less. When the surface roughness Ra is excessively high, there is a possibility that the anode current collector 21A is easily cracked due to expansion of the anode active material layer 21B. The surface roughness Ra means the arithmetic average roughness Ra specified in JIS B0601. It is enough that the surface roughness Ra in at least the region of the anode current collector 21A where the anode active material layer 21B is provided is within the foregoing range.

The anode active material layer 21B contains one of silicon and tin as an element. Silicon and tin have a high ability to insert and extract lithium, and provides the high energy density. Silicon and tin may be contained in the form of a simple substance, an alloy, or a compound.

At least part of the anode active material layer 21B is preferably formed by, for example, one or more methods selected from the group consisting of vapor-phase deposition method, spraying method, firing method, and liquid-phase deposition method. Thereby, fracture due to the expansion and shrinkage of the anode active material layer 21B according to charge and discharge can be prevented. In addition, the anode current collector 21A and the anode active material layer 21B can be integrated, and the electron conductivity in the anode active material layer 21B can be improved. "Firing method" means a method in which heat treatment is provided for a layer formed by mixing powder containing an active material and a binder under the non-oxidizing atmosphere or the like, and thereby a denser layer with the volume density higher than that before heat treatment is formed.

The anode active material layer 21B is preferably alloyed with the interface with the anode current collector 21A at least in part. As described above, the contact characteristics between the anode active material layer 21B and the anode current collector 21A are thereby improved. Specifically, it is preferable that, at the interface, the element of the anode current collector 21A is diffused in the anode active material layer 21B, or the element of the anode active material layer 21B is diffused in the anode current collector 21A, or the both elements are diffused in each other. In the specification, the foregoing diffusion of the elements is also regarded as a form of alloying.

Further, in the anode 21, at least one penetrating portion that is cut out or slit to penetrate the anode current collector 21A and the anode active material layer 21B is formed to extend to include the longitudinal component of the anode current collector 21A. Thereby, the stress due to the expansion and shrinkage of the anode active material layer 21 can be relaxed, and wrinkles can be prevented from being generated.

FIGS. 2A to 2G show expanded plane structures of the anode 21. For example, as shown in FIGS. 2A to 2G, though one or plurality of penetrating portions 21C may be provided, the multiple penetrating portions 21C are preferably provided. It is because when the penetrating portions 21C are uniformly provided on the entire anode 21, higher effects can be obtained. Though the penetrating portion 21C may be a slit without the width or a cutout with the width, the cutout with the width is preferable since thereby higher effects can be obtained. However, if the width is excessively widened, the capacity is lowered. Therefore, the width of the penetrating portion 21C is preferably from 0.1 mm to 5 mm.

Further, as long as the extension direction of the penetrating portion 21C includes the longitudinal component of the anode current collector 21A, the penetrating portion 21C may or may not be parallel to the longitudinal direction. However, the angle θ made by the extension direction and the longitudinal direction is preferably 60 deg or less, and the extension direction and the longitudinal direction are more preferably parallel to each other. In addition, one length in the longitudinal component of the penetrating portion 21C is preferably 25% or more of the length of the anode active material layer 21B, more preferably 50% or more thereof, and much more preferably 70% or more thereof. Further, one length in the longitudinal component of the penetrating portion 21C is preferably 10 mm or more, more preferably 100 mm or more, and much more preferably 300 mm or more. When the length in the longitudinal component is longer, higher effects can be obtained. The length of the anode active material layer 21B means the length in the region where the anode active material layer 21B is provided on the both faces of the anode current collector 21A. When the plurality of penetrating portions 21C is provided, the extension direction, the length, or the width of each penetrating portion 21C may be identical or different.

The cathode 22 has, for example, a strip-shaped cathode current collector 22A and a strip-shaped cathode active material layer 22B provided on the both faces of the cathode current collector 22A. Arrangement is made so that the cathode active material layer 22B faces the anode active material layer 21B. The cathode active material layer 22B may be provided on the whole area or part of the cathode current collector 22A. Further, the region provided with the cathode active material layer 22B on one face of the cathode current collector 22A may or may not correspond with the region provided with the cathode active material layer 22B on the other face of the cathode current collector 22A. Furthermore, the region where the cathode active material layer 22B is provided only on one face of the cathode current collector 22A may exist. The cathode current collector 22A is made of, for example, aluminum, nickel, stainless or the like.

The cathode active material layer 22B contains, for example, as a cathode active material, one or more cathode materials capable of inserting and extracting lithium. The cathode active material layer 22B may contain an electrical conductor such as a carbon material and a binder such as polyvinylidene fluoride according to needs. As a cathode material capable of inserting and extracting lithium, for example, a lithium transition metal complex oxide containing lithium and a transition metal is preferably used. Thereby, the high voltage can be generated, and the high energy density can be obtained. As the lithium transition metal complex oxide, for example, an oxide expressed by a general formula, $Li_xMIO_2$ can be cited. In the formula, M preferably includes one or more transition metal elements, and, for example, preferably includes at least one of cobalt (Co) and nickel. x varies according to the charge and discharge state of the battery, and is generally in the range of $0.05 \leq x \leq 1.10$. As a specific example of such a lithium transition metal complex oxide, $LiCoO_2$, $LiNiO_2$ or the like can be cited.

Figure 3A:
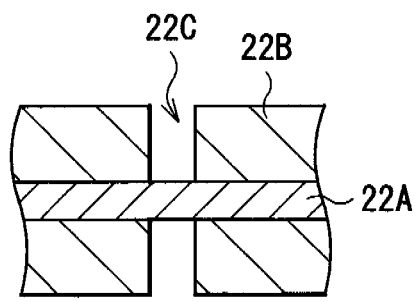
FIGS. 3A to 3C are cross sections showing a structure of a cathode shown in FIG. 1.
Figure 3B:
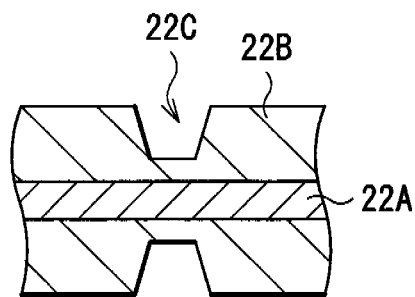
Figure 3C:
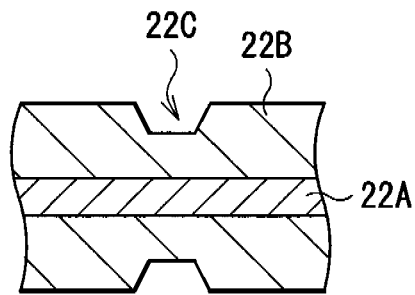

Further, the cathode active material layer 22B may have the identical thickness over the whole area. However, for example, as shown in FIGS. 3A to 3C, a groove 22C may be formed in the portion that faces the penetrating portion 21C provided in the anode 21. Thereby, higher effects can be obtained. It is enough that the groove 22C faces at least part of the penetrating portion 21C. The groove 22C may be provided in the region not facing the penetrating portion 21C. The shape of the groove 22C may be any shape. For example, as shown in FIG. 3A, the groove 22C may reach the cathode current collector 22A, or as shown in FIGS. 3B and 3C, the groove 22C may extend halfway through the cathode active material layer 22B.

The separator 23 separates the anode 21 from the cathode 22, prevents current short circuit due to contact of the both electrodes, and lets through the lithium ions. The separator 23 is made of, for example, polyethylene or polypropylene.

An electrolytic solution as a liquid electrolyte is impregnated in the separator 23. The electrolytic solution contains, for example, a solvent and an electrolyte salt. The electrolytic solution may contain an additive according to needs. As a solvent, for example, a nonaqueous solvent such as ethylene carbonate, propylene carbonate, dimethyl carbonate, diethyl carbonate, ethyl methyl carbonate, 1,3-dioxol-2-one, 4-vinyl-1,3-dioxolane-2-one, and 4-fluoro-1,3-dioxolane-2-one can be cited. One of the solvents may be used singly, or a mixture of two or more solvents may be used. For example, a mixture of a high-boiling point solvent such as ethylene carbonate and propylene carbonate and a low-boiling point solvent such as dimethyl carbonate, diethyl carbonate, and ethyl methyl carbonate is preferably used, since thereby the high ion conductivity can be obtained. Further, a cyclic ester carbonate having an unsaturated bond such as 1,3-dioxol-2-one and 4-vinyl-1,3-dioxolane-2-one, or a carbonic ester derivative having halogen atoms such as 4-fluoro-1,3-dioxolane-2-one is preferably used, since the stability of the electrolytic solution can be improved.

As an electrolyte salt, for example, a lithium salt such as $LiPF_6$, $LiCF_3SO_3$, and $LiClO_4$ can be cited. One of the electrolyte salts may be used singly, or two or more thereof may be used by mixing.

The secondary battery can be fabricated as follows, for example.

First, the anode active material layer 21B is formed on the anode current collector 21A by, for example, vapor-phase deposition method, spraying method, firing method, or liquid-phase deposition method to form the anode 21. Two or more methods thereof may be combined, or other method may be combined therewith to form the anode active material layer 21B. As vapor-phase deposition method, for example, physical deposition method or chemical deposition method can be cited. Specifically, any of vacuum vapor deposition method, sputtering method, ion plating method, laser ablation method, CVD (Chemical Vapor Deposition) method or the like may be cited. As liquid-phase deposition method, for example, plating method can be cited. After the anode active material layer 21B is formed, heat treatment is performed under the vacuum atmosphere or under the non-oxidizing atmosphere if necessary. In some cases, the anode active material layer 21B and the anode current collector 21A are alloyed concurrently when the anode active material layer 21B is formed. However, by performing heat treatment, alloying can be more promoted. Next, the penetrating portion 21C is formed in the anode 21.

Further, the cathode active material layer 22B is formed on the cathode current collector 22A. For example, a cathode active material, and if necessary an electrical conductor and a binder are mixed, the cathode current collector 22A is coated with the resultant mixture, and the resultant is compression-molded to form the cathode. At this time, according to needs, the groove 22C may be formed in the cathode active material layer 22B. Next, the anode lead 24 is attached to the anode 21, and the cathode lead 25 is attached to the cathode 22. Subsequently, the anode 21 and the cathode 22 are layered with the separator 23 in between and spirally wound several times. After that, the end of the anode lead 24 is welded to the battery can 11, the end of the cathode lead 25 is electrically connected to the terminal pin 16, and the spirally wound anode 21 and the cathode 22 are sandwiched between the pair of insulating plates 12 and 13, and the resultant lamination is inserted in the battery can 11. After that, an electrolytic solution is injected in the battery can 11, and impregnated in the separator 23. The open end of the battery can 11 is sealed with the battery cover 14. Thereby, the secondary battery shown in FIG. 1 is obtained.

In the secondary battery, when charged, for example, lithium ions are extracted from the cathode 22 and inserted in the anode 21 through the electrolytic solution. When discharged, for example, lithium ions are extracted from the anode 21 and inserted in the cathode 22 through the electrolytic solution. At this time, the anode active material layer 21B is largely expanded and shrunk. However, since the penetrating portion 21C is provided in the anode 21, the stress is relaxed, and wrinkles are prevented from being generated.

As above, according to this embodiment, the penetrating portion 21C that penetrates the anode current collector 21A and the anode active material layer 21B is formed to extend to include the longitudinal component. Thereby, the stress due to the expansion and shrinkage can be relaxed, and wrinkles can be prevented from being generated. In the result, separation of the anode active material layer 21B and increase of the thickness of the anode 21 can be prevented. Therefore, the battery characteristics such as cycle characteristics can be improved, and the battery can be prevented from being swollen.

In particular, in the case that the extension direction of the penetrating portion 21C is parallel to the longitudinal direction of the anode current collector 21A, in the case that the angle made by the extension direction of the penetrating portion 21C and the longitudinal direction of the anode current collector 21A is 60 deg or less, in the case that one length in the longitudinal component of the penetrating portion 21C is 25% or more of the length of the anode active material layer 21B, preferably 50% or more thereof, and more preferably 70% or more, in the case that the plurality of penetrating portions 21C are provided, or in the case that the width of the penetrating portion 21C is from 0.1 mm to 5 mm, higher effects can be obtained.

Second Embodiment

Figure 4:
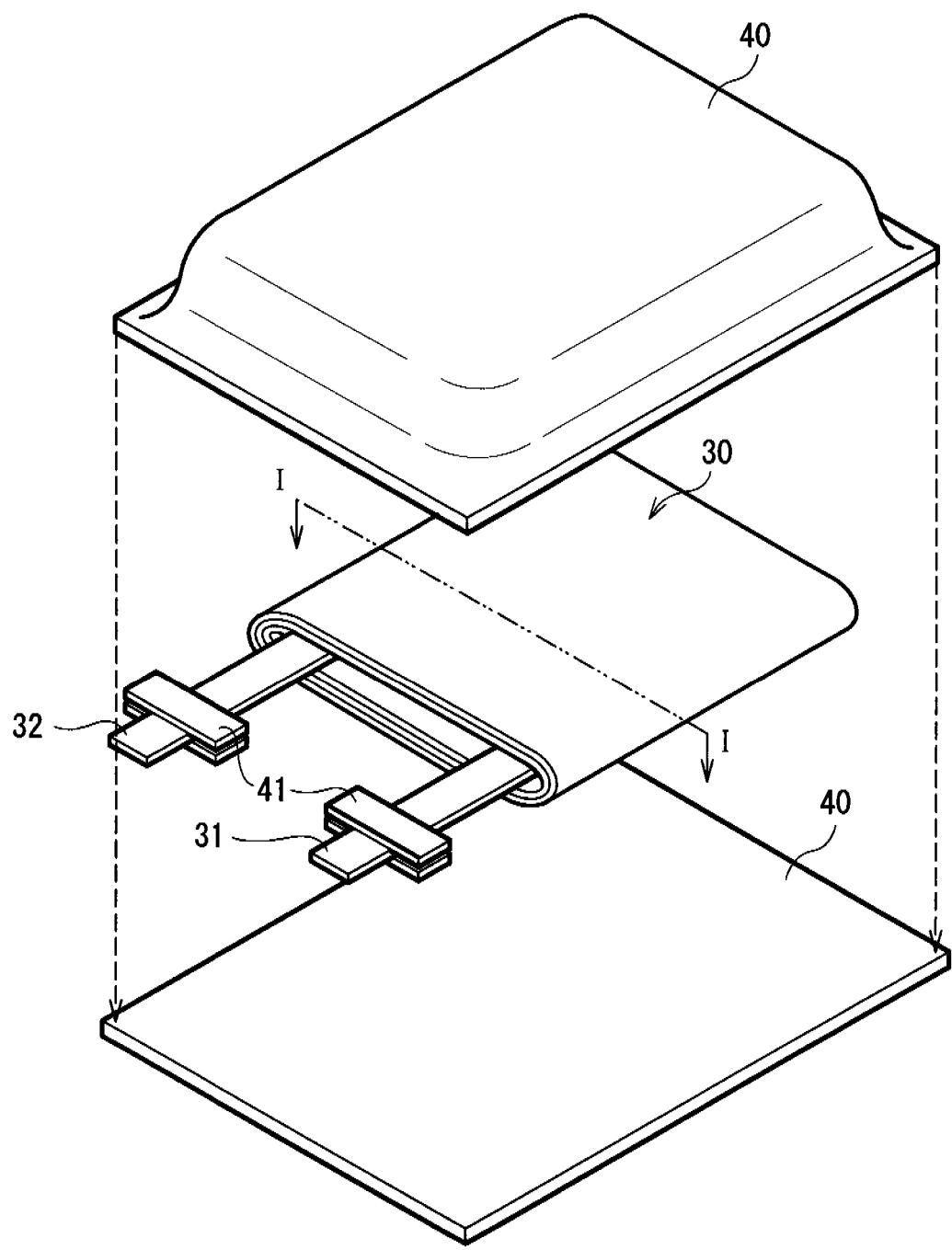
FIG. 4 is an exploded perspective view showing a structure of a secondary battery according to a second embodiment of the invention.

FIG. 4 shows a structure of a secondary battery according to a second embodiment of the invention. In the secondary battery, a battery element 30 on which leads 31 and 32 are attached is contained inside a film package member 40. The leads 31 and 32 are respectively made of, for example, a metal material such as aluminum, copper, nickel, and stainless. The leads 31 and 32 are respectively directed from inside to outside of the package member 40 and derived in the same direction, for example.

The package member 40 is made of a rectangular aluminum laminated film in which, for example, a nylon film, an aluminum foil, and a polyethylene film are bonded together in this order. The package member 40 is, for example, arranged so that the polyethylene film side and the battery element 30 face each other, and the respective outer edges are contacted to each other by fusion bonding or an adhesive. Adhesive films 41 to protect from entering of outside air are inserted between the package member 40 and the leads 31 and 32. The adhesive film 41 is made of a material having contact characteristics to the leads 31 and 32, for example, a polyolefin resin such as polyethylene, polypropylene, modified polyethylene, and modified polypropylene. The package member 40 may be made of a laminated film having other structure, a polymer film such as polypropylene, or a metal film, instead of the foregoing aluminum laminated film.

Figure 5:
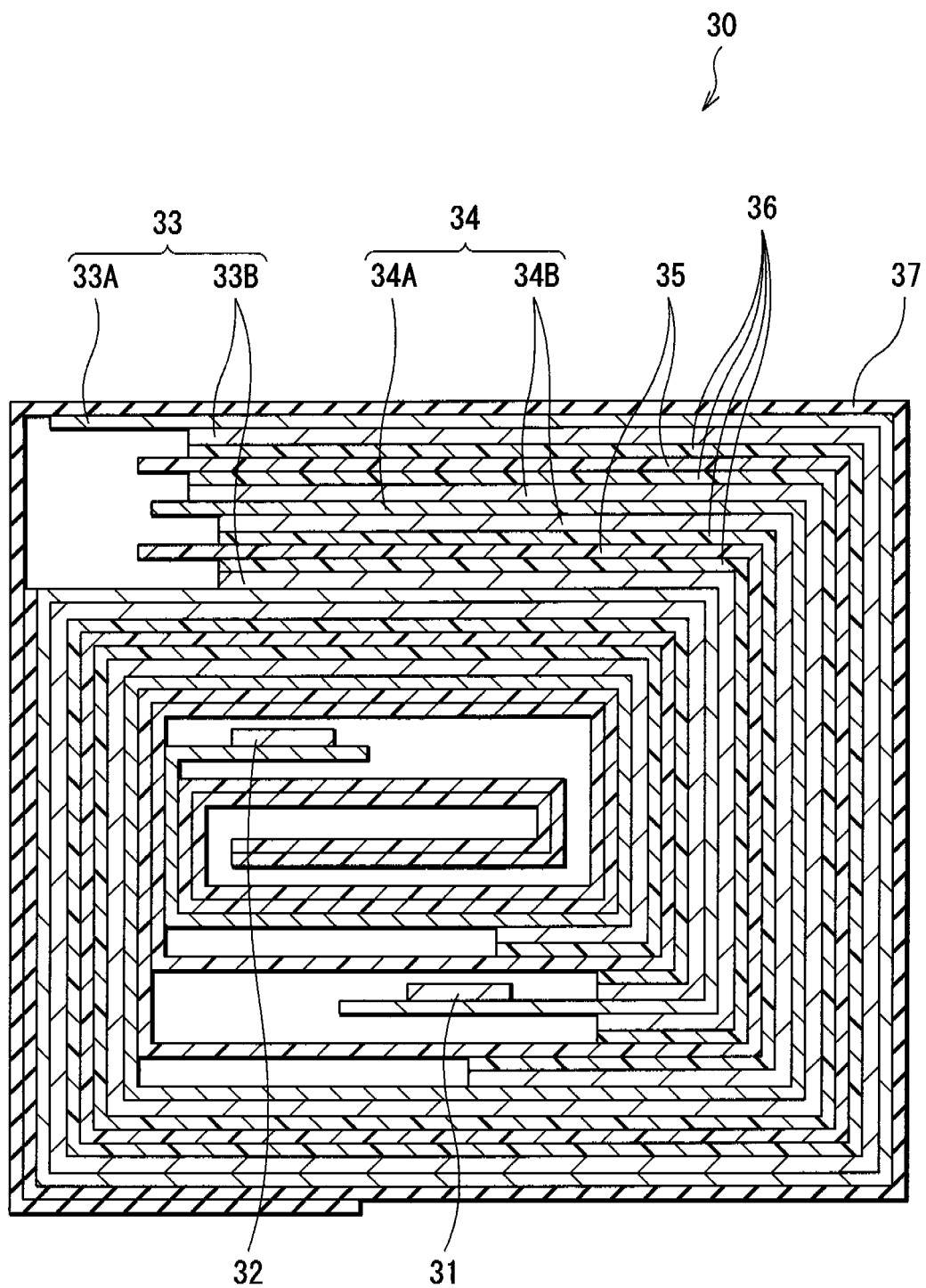
FIG. 5 is a cross section showing a structure taken along line I-I of the secondary battery shown in FIG. 4.

FIG. 5 shows a cross sectional structure taken along line I-I of the battery element 30 shown in FIG. 4. In the battery element 30, a strip-shaped anode 33 and a strip-shaped cathode 34 are layered with a separator 35 and an electrolyte 36 in between, and spirally wound several times in the oval shape or in the flat shape. The outermost periphery thereof is protected by a protective tape 37. The anode 33 has a structure in which an anode active material layer 33B is provided on the both faces of a strip-shaped anode current collector 33A. The cathode 34 has a structure in which a cathode active material layer 34B is provided on the both faces of a strip-shaped cathode current collector 34A. The structures of the anode current collector 33A, the anode active material layer 33B, the cathode current collector 34A, the cathode active material layer 34B, and the separator 35 are similar to those of the anode current collector 21A, the anode active material layer 21B, the cathode current collector 22A, the cathode active material layer 22B, and the separator 23 described in the first embodiment. That is, though not shown in FIG. 5, the penetrating portion that penetrates the anode current collector 33A and the anode active material layer 33B and extends to include the longitudinal component is provided in the anode 33. The groove may be provided at least in part of the cathode active material layer 34B facing the penetrating portion of the anode 33.

The electrolyte 36 is made of a so-called gelatinous electrolyte in which an electrolytic solution is held by a polymer. The composition of the electrolytic solution is similar to that of the first embodiment. As a polymer material, for example, polyvinylidene fluoride or a copolymer of vinylidene fluoride can be cited. For example, as shown in FIG. 5, the electrolyte 36 may exist in the form of layer between the anode 33/the cathode 34 and the separator 35. Otherwise, the electrolyte 36 may be impregnated in the separator 35. Otherwise, as in the first embodiment, the electrolytic solution may be directly used, instead of being held by the polymer.

The secondary battery can be manufactured, for example, as follows.

First, the anode 33 and the cathode 34 are formed as in the first embodiment. After that, the electrolyte 36 is formed on the anode 33 and the cathode 34. Next, the leads 31 and 32 are attached to the anode 33 and the cathode 34. Subsequently, the anode 33 and the cathode 34 respectively formed with the electrolyte 36 are layered with the separator 35 in between and spirally wound. The protective tape 37 is adhered to the outermost periphery thereof to form the battery element 30. After that, for example, the battery element 30 is sandwiched between the package members 40, and the outer edges of the package members 40 are contacted by thermal fusion bonding or the like to enclose the battery element 30. Thereby, the secondary battery shown in FIGS. 4 and 5 is obtained.

Otherwise, the secondary battery may be assembled as follows. First, the anode 33 and the cathode 34 are formed as in the first embodiment. After that, the leads 31 and 32 are attached thereto. Next, the anode 33 and the cathode 34 are layered with the separator 35 in between and spirally wound. The protective tape 37 is adhered to the outermost periphery thereof, and a spirally wound body is formed. Subsequently, the spirally wound body is sandwiched between the package members 40, and the outermost peripheries except for one side are thermally fusion-bonded to obtain a pouched state. After that, a electrolytic composition containing an electrolytic solution, a monomer as a raw material for a polymer, a polymerization initiator, and if necessary other material such as a polymerization inhibitor is injected into the package member 40. After that, the opening of the package member 40 is thermally fusion-bonded and hermetically sealed in the vacuum atmosphere. Then, the resultant is heated to polymerize the monomer to obtain a polymer. Thereby, the gelatinous electrolyte 36 is formed. Consequently, the secondary battery shown in FIGS. 4 and 5 is obtained.

Figure 6A:
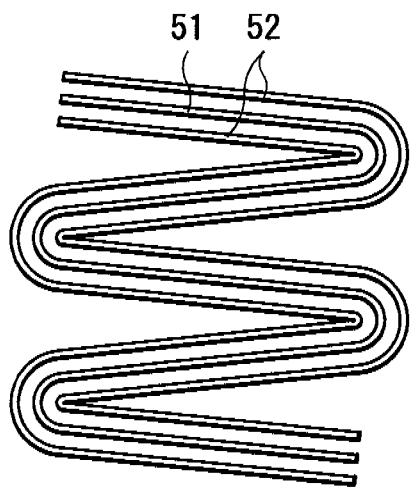
FIGS. 6A and 6B are views showing a modification of the invention.
Figure 6B:
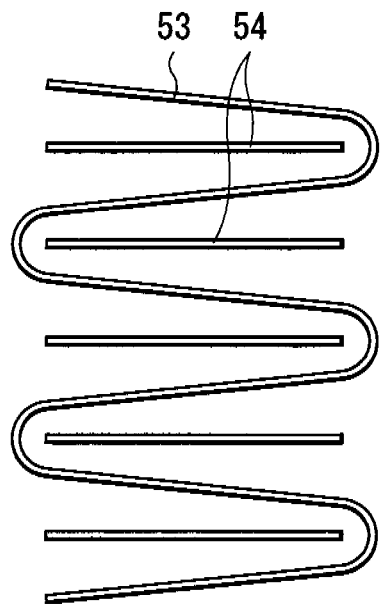

The secondary battery operates similarly to the secondary battery in the first embodiment, and has effects similar to those of the secondary battery in the first embodiment.
Modification In the first and the second embodiments described above, the description has been given of the case that the secondary battery has the battery elements 20 or 30 having the spirally wound structure obtained by layering the anodes 21, 33 and the cathodes 22, 34 and spirally winding the resultant. However, for example, as shown in FIG. 6A, it is possible to adopt a structure in which a strip-shaped anode 51 and a strip-shaped cathode 52 are layered and folded. Further, as shown in FIG. 6B, it is possible to adopt a structure in which a strip-shaped anode 53 is folded, and a plate-shaped cathode 54 is inserted therein. The structures of the anodes 51 and 53 and the cathodes 52 and 54 are the same as those of the anodes 21 and 33 and the cathodes 22 and 34 in the foregoing embodiments. In the cathode 52, it is possible that the cathode active material layer is provided on the both faces of the cathode current collector. Otherwise, the cathode active material layer may be provided only on the face opposed to the anode 51. Though not shown in FIG. 6, a separator impregnated with an electrolytic solution, or the separator and a so-called gelatinous electrolyte are inserted between the anodes 51 and 53, and the cathodes 52 and 54 as in the foregoing embodiments.

EXAMPLES

Further, specific examples of the invention will be hereinafter described in detail with reference to the drawings.

Examples 1-1 to 1-37

The secondary batteries having the structure shown in FIGS. 4 and 5 were fabricated. First, silicon was deposited by vacuum vapor deposition method on the both faces of the strip-shaped anode current collector 33A made of a copper foil with the surface roughened and being 12 μm thick to form the anode active material layer 33B being about 5 μm thick. Next, heat treatment was performed in the reduced pressure atmosphere. After that, the penetrating portion was formed by forming a slit or a cutout to penetrate the anode current collector 33A and the anode active material layer 33B. The penetrating portion was parallel to the longitudinal direction of the anode current collector 33A. The length and the width per penetrating portion and the number of penetrating portions were changed in each example as shown in Table 1. The length of the penetrating portion is indicated by the ratio of the length of the penetrating portion to the length of the anode active material layer 33B. In these examples, the penetrating portion was formed to be parallel to the anode current collector 33A. Therefore, the length of the longitudinal component of the penetrating portion is the same as the length of the penetrating portion. For each of the formed anodes 33 of Examples 1-1 to 1-37, a cross section in the thickness direction was cut out by Focused Ion Beam (FIB). After that, the cut-out cross section was provided with local element analysis by Auger Electron Spectroscopy (AES). In the result, it was confirmed that in all cases, the anode active material layer 33B and the anode current collector 33A were alloyed at least in part.

Further, 92 parts by weight of lithium cobaltate (LiCoO$_2$) powder being 5 μm in the average particle diameter as a cathode active material, 3 parts by weight of carbon black as an electrical conductor, and 5 parts by weight of polyvinylidene fluoride as a binder were mixed. The resultant mixture was put in N-methyl-2-pyrrolidone as a disperse medium to obtain slurry. Next, the both faces of the cathode current collector 34A made of a strip-shaped aluminum foil being 15 μm thick were coated with the slurry, which was dried and pressed to form the cathode active material layer 34B.

Subsequently, 37.5 wt % of ethylene carbonate, 37.5 wt % of propylene carbonate, 10 wt % of vinylene carbonate, and 15 wt % of LiPF$_6$ were mixed to prepare an electrolytic solution. The both faces of the anode 33 and the cathode 34 were respectively coated with a mixture of 30 parts by weight of the electrolytic solution and 10 parts by weight of a copolymer of vinylidene fluoride and hexafluoropropylene to form the electrolyte 36. After that, the leads 31 and 32 were attached, the anode 33 and the cathode 34 were layered with the separator 35 in between and spirally wound, and the resultant body was enclosed in the package member 40 made of an aluminum laminated film. Thereby, the secondary battery was assembled.

As Comparative example 1-1 relative to Examples 1-1 to 1-37, a secondary battery was assembled in the same manner as in Examples 1-1 to 1-37, except that the penetrating portion was not formed in the anode. Further, as Comparative examples 1-2 and 1-3, secondary batteries were assembled in the same manner as in Examples 1-1 to 1-37, except that the anode active material layer was formed only on one face of the anode current collector in Comparative examples 1-2 and 1-3, and the penetrating portion was not formed in Comparative example 1-2. In Comparative example 1-3, the penetrating portion was parallel to the longitudinal direction, and the length, the width, and the number thereof were as shown in Table 1.

Further, as Comparative examples 1-4 to 1-6, anodes are formed by using mesophase carbon microbeads as an anode active material, and secondary batteries were assembled in the same manner as in Examples 1-1 to 1-37. The anode was formed as follows. 87 parts by weight of the mesophase carbon microbeads as an anode active material, 3 parts by weight of carbon black as an electrical conductor, and 5 parts by weight of polyvinylidene fluoride as a binder were added to N-methyl-2-pyrrolidone as a disperse medium and mixed. Next, the both faces of the anode current collector as in Examples 1-1 to 1-37 were coated with the resultant mixture, which was dried and pressed to form the anode active material layer. At that time, in Comparative example 1-4, the penetrating portion was not formed in the anode. In Comparative example 1-5, the slit penetrating portion was formed parallel to the longitudinal direction. In Comparative example 1-6, the cutout penetrating portion was formed parallel to the longitudinal direction. The length, the width, and the number of the penetrating portions were as shown in Table 1.

In addition, as Comparative example 1-7, a secondary battery was assembled in the same manner as in Examples 1-1 to 1-37, except that the anode active material layer was formed on the both faces of the anode current collector in which a slit was provided parallel to the longitudinal direction, and the slit was not provided in the anode active material layer. The length and the number of the slits in the anode current collector are as shown in Table 2.

Further, as Comparative example 1-8, a secondary battery was assembled in the same manner as in Examples 1-1 to 1-37, except that the penetrating portion was not formed in the anode, and a groove was formed by cutting part of the anode active material layer. The length and the number of the grooves in the anode active material layer are as shown in Table 2.

Furthermore, as Comparative example 1-9, a secondary battery was assembled in the same manner as in Examples 1-1 to 1-37, except that the anode active material layer was formed on the both faces of the anode current collector in which a plurality of projections were provided, and the penetrating portion was not provided. The length and the number of the projections in the anode current collector are as shown in Table 2.

For the fabricated secondary batteries of Examples 1-1 to 1-37 and Comparative examples 1-1 to 1-9, charge and discharge test was performed at 25 deg C., and the capacity retention ratio at the 31st cycle to the second cycle was obtained. Charge was performed until the battery voltage reached 4.2 V at the constant current density of 1 mA/cm$^2$, and then performed until the current density reached 0.05 mA/cm$^2$ at the constant voltage of 4.2 V. Discharge was performed until the battery voltage reached 2.5 V at the constant current density of 1 mA/cm$^2$. Charge was performed so that the utility ratio of the capacity of the anode 33 became 85% to prevent metal lithium from being precipitated on the anode 33. The capacity retention ratio was calculated as the ratio of the discharge capacity at the 31st cycle to the discharge capacity at the second cycle, that is, as (the discharge capacity at the 31st cycle/the discharge capacity at the second cycle)×100.

Further, for the fabricated secondary batteries of Examples 1-1 to 1-37 and Comparative examples 1-1 to 1-9, the thickness of the battery was measured before performing charge and discharge and after performing the 31 cycle charge and discharge. Then, the thickness increasing ratio after the 31st was examined. The thickness increasing ratio was calculated as the ratio of the thickness increasing amount after the 31st cycle to the thickness before charge and discharge, that is, as [(the thickness after the 31st cycle−the thickness before charge and discharge)/the thickness before charge and discharge]×100. The obtained results are shown in Tables 1 and 2.

TABLE 1

| | Anode active material layer | Anode forming method | Penetrating portion | | | | Capacity retention ratio (%) | Thickness increasing ratio (%) |
|---|---|---|---|---|---|---|---|---|
| | | | Shape | Length (%) | Width (mm) | Number | | |
| Example 1-1 | Si (both faces) | Vapor deposition | Slit | 5 | 0 | 40 | 68 | 49 |
| Example 1-2 | | | | 10 | | 20 | 69 | 45 |
| Example 1-3 | | | | 20 | | 10 | 70 | 41 |
| Example 1-4 | | | | 25 | | 1 | 79 | 23 |
| Example 1-5 | | | | | | 5 | 82 | 20 |
| Example 1-6 | | | | | | 10 | 84 | 10 |
| Example 1-7 | | | | | | 15 | 86 | 8 |
| Example 1-8 | | | | | | 30 | 89 | 7 |
| Example 1-9 | | | | 30 | | 1 | 81 | 20 |
| Example 1-10 | | | | | | 5 | 84 | 17 |
| Example 1-11 | | | | | | 10 | 87 | 7 |
| Example 1-12 | | | | | | 15 | 88 | 7 |
| Example 1-13 | | | | | | 30 | 90 | 6 |
| Example 1-14 | | | | 50 | | 1 | 83 | 17 |
| Example 1-15 | | | | | | 5 | 88 | 10 |
| Example 1-16 | | | | | | 10 | 92 | 6 |
| Example 1-17 | | | | 70 | | 1 | 84 | 14 |
| Example 1-18 | | | | | | 2 | 86 | 10 |
| Example 1-19 | | | | | | 3 | 88 | 8 |
| Example 1-20 | | | | | | 4 | 90 | 6 |
| Example 1-21 | | | | | | 5 | 94 | 5 |
| Example 1-22 | | | | 90 | | 1 | 85 | 13 |
| Example 1-23 | | | | | | 2 | 87 | 8 |
| Example 1-24 | | | | | | 3 | 89 | 7 |
| Example 1-25 | Si (both faces) | Vapor deposition | Cutout | 25 | 0.5 | 1 | 80 | 21 |
| Example 1-26 | | | | | | 5 | 84 | 18.2 |
| Example 1-27 | | | | | | 10 | 85 | 9.4 |
| Example 1-28 | | | | | | 15 | 85.5 | 7.5 |
| Example 1-29 | | | | | | 30 | 90.2 | 6.1 |
| Example 1-30 | | | | 50 | | 1 | 85 | 14 |
| Example 1-31 | | | | | | 2 | 88 | 8 |
| Example 1-32 | | | | | | 4 | 92 | 5.2 |
| Example 1-33 | | | | 70 | | 1 | 85.2 | 14 |
| Example 1-34 | | | | | | 2 | 87.1 | 10 |
| Example 1-35 | | | | | | 3 | 89.5 | 8 |
| Example 1-36 | | | | | | 4 | 92.1 | 6 |
| Example 1-37 | | | | | | 5 | 95.1 | 5 |
| Comparative example 1-1 | Si (both faces) | Vapor deposition | — | — | — | — | 64 | 55 |
| Comparative example 1-2 | Si (one face) | | — | — | — | — | 90 | 3 |
| Comparative example 1-3 | | | Slit | 70 | 0 | 2 | 90 | 3 |
| Comparative example 1-4 | Artificial graphite | Coating | — | — | — | — | 91 | 1 |

TABLE 1-continued

| | Anode active material layer | Anode forming method | Penetrating portion | | | Capacity retention ratio (%) | Thickness increasing ratio (%) |
|---|---|---|---|---|---|---|---|
| | | | Shape | Length (%) | Width (mm) | Number | | |

| | Anode active material layer | Anode forming method | Shape | Length (%) | Width (mm) | Number | Capacity retention ratio (%) | Thickness increasing ratio (%) |
|---|---|---|---|---|---|---|---|---|
| Comparative example 1-5 | (both faces) | | Slit | 70 | 0 | 2 | 92 | 1 |
| Comparative example 1-6 | | | Cutout | 70 | 0.5 | 1 | 91 | 1 |

TABLE 2

| | Anode active material layer | Anode forming method | Fabrication state of anode | | | | Capacity retention ratio (%) | Thickness increasing ratio (%) |
|---|---|---|---|---|---|---|---|---|
| | | | Shape | Length (%) | Width (mm) | Number | | |
| Example 1-18 | Si (both faces) | Vapor deposition | Penetrating portion (slit) | 70 | 0 | 2 | 86 | 10 |
| Example 1-34 | | | Penetrating portion (cutout) | 70 | 0.5 | 2 | 87.1 | 10 |
| Comparative example 1-7 | Si (both faces) | Vapor deposition | Slit in anode current collector | 70 | 0 | 2 | 31 | 11 |
| Comparative example 1-8 | | | Groove in anode active material layer | 70 | 0.5 | 2 | 82 | 10.3 |
| Comparative example 1-9 | | | Projection in anode current collector | 0.01 | — | 20 (/cm$^2$) | 41 | 10.6 |

As shown in Table 1, according to Examples 1-1 to 1-37, the capacity retention ratio was improved and the thickness increasing ratio was smaller compared to in Comparative example 1-1. On the contrary, in Comparative examples 1-2 and 1-3 in which the anode active material layer was formed only on one face, and in Comparative examples 1-4 to 1-6 in which the carbon material was used as the anode active material, the characteristics were not different regardless of existence or nonexistence of the penetrating portion.

Further, as shown in Table 2, in Comparative example 1-7 in which the slit was provided only in the anode current collector and in Comparative example 1-9 in which the projection was provided in the anode current collector, while the thickness increasing ratio was decreased, the capacity retention ratio was lowered. Furthermore, in Comparative example 1-8 in which the groove was formed in the anode active material layer, the characteristics were lower than those of Example 1-34, and the capacity was lowered though not shown in Table 2.

That is, it was found that when in the anode in which the anode active material layer containing silicon as an element was provided on the both faces of the anode current collector, the penetrating portion that penetrated the anode current collector 33A and the anode active material layer 33B was formed to extend to include the longitudinal component of the anode current collector 33A, the stress concentration could be relaxed, the battery characteristics such as cycle characteristics could be improved, and the swollenness of the battery could be prevented.

Further, from the results of Examples 1-1 to 1-37, there was a tendency that as the length of the penetrating portion was increased, or as the number of the penetrating portions was increased, the characteristics were improved. That is, it was found that the plurality of penetrating portions were preferably provided, and one length in the longitudinal component of the penetrating portion was preferably 25% or more of the length of the anode active material layer 33B, more preferably 50% or more thereof, and much more preferably 70% or more.

Examples 2-1 to 2-6

Secondary batteries were assembled in the same manner as in Examples 1-18 and 1-34, except that the width of the penetrating portion was changed as shown in Table 3. For the fabricated secondary batteries of Examples 2-1 to 2-6, charge and discharge were performed in the same manner as in Examples 1-18 and 1-34, and the capacity retention ratio and the thickness increasing ratio were examined. The obtained results are are shown in Table 3 together with the results of Examples 1-18 and 1-34. In addition, the discharge capacity at the second cycle is shown as a relative value where the value of Example 1-18 is 100.

TABLE 3

| | Anode active material layer | Anode forming method | Penetrating portion | | | Capacity retention ratio (%) | Thickness increasing ratio (%) | Capacity (relative value) |
|---|---|---|---|---|---|---|---|---|
| | | | Shape | Length (%) | Width (mm) | Number | | | |
| Example 1-18 | Si (both faces) | Vapor deposition | Slit | 70 | 0 | 2 | 86 | 10 | 100 |
| Example 2-1 | | | Cutout | | 0.1 | | 86.5 | 10 | 99 |
| Example 1-34 | | | | | 0.5 | | 87.1 | 10 | 98 |

TABLE 3-continued

|  | Anode active material layer | Anode forming method | Shape | Penetrating portion Length (%) | Width (mm) | Number | Capacity retention ratio (%) | Thickness increasing ratio (%) | Capacity (relative value) |
|---|---|---|---|---|---|---|---|---|---|
| Example 2-2 |  |  |  |  |  | 1 | 92.1 | 5 | 97 |
| Example 2-3 |  |  |  |  |  | 3 | 94.2 | 4.5 | 90 |
| Example 2-4 |  |  |  |  |  | 5 | 95.1 | 4 | 85 |
| Example 2-5 |  |  |  |  |  | 7 | 95 | 4 | 79 |
| Example 2-6 |  |  |  |  |  | 10 | 95.2 | 4 | 70 |

As shown in Table 3, it was found that as the width was increased, while the capacity retention ratio was improved and the thickness increasing ratio was decreased, the capacity was decreased. That is, it was found that the width of the penetrating portion was preferably from 0.1 mm to 5 mm.

Examples 3-1 to 3-20

Secondary batteries were assembled in the same manner as in Examples 1-1 to 1-37, except that the length of the penetrating portion was changed not based on the ratio of the length of the penetrating portion to the length of the anode active material layer 33B, but based on concrete numerical values from 10 mm to 500 mm. For the fabricated secondary batteries of Examples 3-1 to 3-20, charge and discharge were performed in the same manner as in Examples 1-1 to 1-37, and the capacity retention ratio and the thickness increasing ratio were examined. The obtained results are shown in Table 4 together with the result of Comparative example 1-1.

TABLE 4

|  | Anode active material layer | Anode forming method | Shape | Penetrating portion Length (mm) | Width (mm) | Number | Capacity retention ratio (%) | Thickness increasing ratio (%) |
|---|---|---|---|---|---|---|---|---|
| Example 3-1 | Si | Vapor | Slit | 10 | 0 | 10 | 78 | 24 |
| Example 3-2 | (both | deposition |  |  |  | 20 | 81 | 21 |
| Example 3-3 | faces) |  |  |  |  | 30 | 83 | 15 |
| Example 3-4 |  |  |  |  |  | 40 | 86.8 | 10.2 |
| Example 3-5 |  |  |  | 100 |  | 5 | 88.5 | 10.3 |
| Example 3-6 |  |  |  |  |  | 10 | 90.1 | 8.4 |
| Example 3-7 |  |  |  | 300 |  | 1 | 84.1 | 13.5 |
| Example 3-8 |  |  |  |  |  | 2 | 92.1 | 8.1 |
| Example 3-9 |  |  |  | 500 |  | 1 | 85.3 | 11.2 |
| Example 3-10 |  |  |  |  |  | 2 | 93.1 | 8 |
| Example 3-11 |  |  | Cutout | 10 | 0.5 | 10 | 79 | 21 |
| Example 3-12 |  |  |  |  |  | 20 | 82.3 | 18 |
| Example 3-13 |  |  |  |  |  | 30 | 84.6 | 13.2 |
| Example 3-14 |  |  |  |  |  | 40 | 87.6 | 9.2 |
| Example 3-15 |  |  |  | 100 |  | 5 | 90.1 | 8.6 |
| Example 3-16 |  |  |  |  |  | 10 | 91.3 | 8 |
| Example 3-17 |  |  |  | 300 |  | 1 | 85.6 | 11.3 |
| Example 3-18 |  |  |  |  |  | 2 | 93.2 | 7.5 |
| Example 3-19 |  |  |  | 500 |  | 1 | 86.2 | 9.8 |
| Example 3-20 |  |  |  |  |  | 2 | 96.2 | 5.1 |
| Comparative example 1-1 | Si | Vapor deposition | — | — | — | — | 64 | 55 |

As shown in Table 4, there was a tendency that, as in the Examples 1-1 to 1-37, as the length of the penetrating portion was longer, or as the number of the penetrating portions was larger, the characteristics were improved. That is, it was found that one length in the longitudinal component of the penetrating portion was preferably from 10 mm or more, more preferably 100 mm or more, and much more preferably 300 mm or more.

Examples 4-1 to 4-5 and 5-1 to 5-4

Secondary batteries were assembled in the same manner as in Examples 1-1 to 1-37, except that the penetrating portion was not parallel to the anode current collector 33A, the angle made by the penetrating portion and the longitudinal direction of the anode current collector 33A was changed as shown in Tables 5 and 6, and the length, the width, and the number of the penetrating portions were as shown in Tables 5 and 6. Further, as Comparative examples 4-1 and 5-1 relative to Examples 4-1 to 4-5 and 5-1 and 5-4, secondary batteries were assembled in the same manner as in Examples 1-1 to 1-37, except that the penetrating portion was formed perpendicular to the longitudinal direction of the anode current collector 33A, and the length, the width, and the number of the penetrating portions were as shown in Tables 5 and 6. For the fabricated secondary batteries of Examples 4-1 to 4-5 and 5-1 to 5-4 and Comparative examples 4-1 and 5-1, charge and discharge were performed in the same manner as in Examples 1-1 to 1-37, and the capacity retention ratio and the thickness increasing ratio were examined. The obtained results are shown in Tables 5 and 6 together with the result of Comparative example 1-1.

TABLE 5

| | Anode active material layer | Anode forming method | Penetrating portion | | | | Capacity retention ratio (%) | Thickness increasing ratio (%) |
| | | | Shape | Length (mm) | Width (mm) | Number | Angle (deg) | | |
|---|---|---|---|---|---|---|---|---|---|
| Example 4-1 | Si (both faces) | Vapor deposition | Slit | 10 | 0 | 20 | 30 | 81.1 | 21.2 |
| Example 4-2 | | | | | | | 60 | 78.3 | 21.3 |
| Example 4-3 | | | | | | | 70 | 70.1 | 32 |
| Example 4-4 | | | | 300 | | 1 | 10 | 83.9 | 16 |
| Example 4-5 | | | | 100 | | 5 | 10 | 88.4 | 15 |
| Comparative example 1-1 | Si (both faces) | Vapor deposition | — | — | — | — | — | 64 | 55 |
| Comparative example 4-1 | | | Slit | 10 | 0 | 20 | 90 | 69 | 49 |

TABLE 6

| | Anode active material layer | Anode forming method | Penetrating portion | | | | Capacity retention ratio (%) | Thickness increasing ratio (%) |
| | | | Shape | Length (mm) | Width (mm) | Number | Angle (deg) | | |
|---|---|---|---|---|---|---|---|---|---|
| Example 5-1 | Si | Vapor deposition | Cutout | 10 | 0.5 | 20 | 30 | 82 | 19.2 |
| Example 5-2 | | | | | | | 60 | 79.3 | 20.3 |
| Example 5-3 | | | | 300 | | 1 | 10 | 84.6 | 11.2 |
| Example 5-4 | | | | 100 | | 5 | 10 | 90 | 9.1 |
| Comparative example 1-1 | Si (both faces) | Vapor deposition | — | — | — | — | — | 64 | 55 |
| Comparative example 5-1 | | | Cutout | 10 | 0.5 | 20 | 90 | 71.5 | 41 |

As shown in Tables 5 and 6, when the angle made by the extension direction of the penetrating portion and the longitudinal direction of the anode current collector 33A was smaller, higher characteristics could be obtained. That is, it was found that when the extension direction of the penetrating portion was parallel to the longitudinal direction of the anode current collector 33A, or when the angle made by the extension direction of the penetrating portion and the longitudinal direction of the anode current collector 33A was 60 deg or less, more preferable effects could be obtained.

Examples 6-1 to 6-4

Secondary batteries were assembled in the same manner as in Examples 1-1 to 1-37, except that the surface roughness Ra of the anode current collector 33A was changed in the range from 0.1 μm to 0.5 μm. The penetrating portion was parallel to the longitudinal direction of the anode current collector 33A, the shape thereof was a slit, the length of each penetrating portion was 70% of the length of the anode active material layer 33B, and the number thereof was 2. For the fabricated secondary batteries of Examples 6-1 to 6-4, charge and discharge were performed in the same manner as in Examples 1-1 to 1-37, and the capacity retention ratio and the thickness increasing ratio were examined. The obtained results are shown in Table 7.

TABLE 7

| | Anode active material layer | Anode forming method | Surface roughness Ra of anode current collector (μm) | Penetrating portion | | | | Capacity retention ratio (%) | Thickness increasing ratio (%) |
| | | | | Shape | Length (%) | Width (mm) | Number | | |
|---|---|---|---|---|---|---|---|---|---|
| Example 6-1 | Si (both faces) | Vapor deposition | 0.1 | Slit | 70 | 0 | 2 | 79 | 10 |
| Example 6-2 | | | 0.2 | | | | | 85.2 | 10 |
| Example 6-3 | | | 0.4 | | | | | 86 | 10 |
| Example 6-4 | | | 0.5 | | | | | 86.2 | 10 |

As shown in Table 7, there was a tendency that as the surface roughness Ra of the anode current collector 33A was larger, the capacity retention ratio was improved. That is, it was found that the surface roughness Ra of the anode current collector 33A was preferably 0.1 μm or more, and more preferably 0.2 μm or more.

Examples 7-1 to 7-7, 8-1, 8-2, 9-1, 9-2, 10-1, 10-2, and 11-1 to 11-8

Secondary batteries were assembled in the same manner as in Examples 1-1 to 1-37, except that the structure of the anode 33 was changed. In Examples 7-1 to 7-7, 90 parts by weight of silicon powder and 10 parts by weight of polyvinylidene fluoride as a binder were mixed. The resultant mixture was added to N-methyl-2-pyrrolidone as a disperse medium to obtain slurry. Next, the both faces of the anode current collector as in Examples 1-1 to 1-37 were coated with the slurry, which was dried and pressed, and then provided with heat treatment for 12 hours at 220 deg C. in the vacuum atmosphere to form the anode. The penetrating portion was formed parallel to the longitudinal direction. The length, the width, and the number of the penetrating portions were changed as shown in Table. 8.

In Examples 8-1 and 8-2, the anode 33 was formed in the same manner as Examples 1-1 to 1-37, except that the anode active material layer 33B made of silicon was formed by sputtering. The penetrating portion was formed parallel to the longitudinal direction. The length, the width, and the number of the penetrating portions were changed as shown in Table. 9.

In Examples 9-1 and 9-2, the anode 33 was formed in the same manner as Examples 1-1 to 1-37, except that the anode active material layer 33B made of silicon was formed by CVD method. The penetrating portion was formed parallel to the longitudinal direction. The length, the width, and the number of the penetrating portions were changed as shown in Table. 10.

In Examples 10-1 and 10-2, the anode 33 was formed in the same manner as Examples 1-1 to 1-37, except that the anode active material layer 33B made of silicon was formed by spraying method. The penetrating portion was formed parallel to the longitudinal direction. The length, the width, and the number of the penetrating portions were changed as shown in Table 11.

In Examples 11-1 to 11-8, 75 parts by weight of cobalt-tin alloy powder at the atomic ratio of cobalt and tin was Co:Sn=20:80, 20 parts by weight of scale-like graphite, 2 parts by weight of carboxymethyl cellulose as a thickener, and 3 parts by weight of styrene-butadiene rubber as a binder were dispersed in water as a disperse medium. Next, the both faces of the anode current collector as in Examples 1-1 to 1-37 were coated with the resultant, which were dried and pressed to form the anode. The penetrating portion was formed parallel to the longitudinal direction. The length, the width, and the number of the penetrating portions were changed as shown in Table 12.

Further, as Comparative examples 7-1, 8-1, 9-1, 10-1, and 11-1 relative to these examples, anodes were formed and secondary batteries were assembled in the same manner as these examples, except that the penetrating portion was not formed.

For the fabricated secondary batteries of Examples 7-1 to 7-7, 8-1, 8-2, 9-1, 9-2, 10-1, 10-2, and 11-1 to 11-8 and Comparative examples 7-1, 8-1, 9-1, 10-1, and 11-1, charge and discharge were performed in the same manner as in Examples 1-1 to 1-37, and the capacity retention ratio and the thickness increasing ratio were examined. The obtained results are shown in Tables 8 to 12.

TABLE 8

| | Anode active material layer | Anode forming method | Penetrating portion | | | | Capacity retention ratio (%) | Thickness increasing ratio (%) |
| | | | Shape | Length (%) | Width (mm) | Number | | |
| --- | --- | --- | --- | --- | --- | --- | --- | --- |
| Example 7-1 | Si (both faces) | Sintering | Slit | 30 | 0 | 5 | 81 | 15.1 |
| Example 7-2 | | | | | | 10 | 84.2 | 6.5 |
| Example 7-3 | | | | 70 | 0 | 1 | 80.3 | 12.5 |
| Example 7-4 | | | | | | 2 | 84.1 | 9.5 |
| Example 7-5 | | | Cutout | 50 | 0.5 | 2 | 84.5 | 7.4 |
| Example 7-6 | | | | 70 | | 1 | 82.6 | 12.3 |
| Example 7-7 | | | | | | 2 | 85.6 | 8.6 |
| Comparative example 7-1 | Si (both faces) | Sintering | — | — | — | — | 60 | 35 |

TABLE 9

| | Anode active material layer | Anode forming method | Penetrating portion | | | | Capacity retention ratio (%) | Thickness increasing ratio (%) |
| | | | Shape | Length (%) | Width (mm) | Number | | |
| --- | --- | --- | --- | --- | --- | --- | --- | --- |
| Example 8-1 | Si (both faces) | Sputtering | Slit | 70 | 0 | 1 | 82.5 | 18.2 |
| Example 8-2 | | | Cutout | 70 | 0.5 | 1 | 86 | 11 |
| Comparative example 8-1 | Si (both faces) | Sintering | — | — | — | — | 61 | 54 |

TABLE 10

| | Anode active material layer | Anode forming method | Penetrating portion | | | | Capacity retention ratio (%) | Thickness increasing ratio (%) |
| | | | Shape | Length (%) | Width (mm) | Number | | |
| --- | --- | --- | --- | --- | --- | --- | --- | --- |
| Example 9-1 | Si (both faces) | CVD | Slit | 70 | 0 | 1 | 82.1 | 14 |
| Example 9-2 | | | Cutout | 70 | 0.5 | 1 | 85.6 | 7 |
| Comparative example 9-1 | Si (both faces) | CVD | — | — | — | — | 60 | 52 |

TABLE 11

|  | Anode active material layer | Anode forming method | Penetrating portion | | | | Capacity retention ratio (%) | Thickness increasing ratio (%) |
|---|---|---|---|---|---|---|---|---|
|  |  |  | Shape | Length (%) | Width (mm) | Number |  |  |
| Example 10-1 | Si (both faces) | Spraying | Slit | 70 | 0 | 1 | 79.2 | 23 |
| Example 10-2 |  |  | Cutout | 70 | 0.5 | 1 | 82.3 | 11 |
| Comparative example 10-1 | Si (both faces) | Spraying | — | — | — | — | 59 | 60 |

TABLE 12

|  | Anode active material layer | Anode forming method | Penetrating portion | | | | Capacity retention ratio (%) | Thickness increasing ratio (%) |
|---|---|---|---|---|---|---|---|---|
|  |  |  | Shape | Length (%) | Width (mm) | Number |  |  |
| Example 11-1 | CoSn alloy (both faces) | Sintering | Slit | 30 | 0 | 5 | 82.1 | 16.9 |
| Example 11-2 |  |  |  |  |  | 10 | 85 | 7.2 |
| Example 11-3 |  |  |  | 70 | 0 | 1 | 81.4 | 14.2 |
| Example 11-4 |  |  |  |  |  | 2 | 84.9 | 10.6 |
| Example 11-5 |  |  | Cutout | 50 | 0.5 | 2 | 84.6 | 8.9 |
| Example 11-6 |  |  |  |  |  | 4 | 86.5 | 9.4 |
| Example 11-7 |  |  |  | 70 |  | 1 | 83.4 | 13.6 |
| Example 11-8 |  |  |  |  |  | 2 | 85.7 | 9.5 |
| Comparative example 11-1 | CoSn alloy (both faces) | Sintering | — | — | — | — | 61 | 41 |

As shown in Tables 8 to 12, as in Examples 1-1 to 1-37, the capacity retention ratio was improved and the thickness increasing ratio was decreased in these examples. That is, it was found that even when the method of forming the anode 33 was changed, or even when the anode had the anode active material layer 33B containing tin as an element, similar effects could be obtained as well.

Examples 12-1 to 12-4

Secondary batteries were assembled in the same manner as in Examples 1-1 to 1-37, except that a groove was formed in the cathode active material layer 34B according to the penetrating portion of the anode 33. The penetrating portion was parallel to the longitudinal direction of the anode current collector 33A. The shape, the length, and the number of the penetrating portions were as shown in Table 13. For the fabricated secondary batteries of Examples 12-1 to 12-4, charge and discharge were performed in the same manner as in Examples 1-1 to 1-37, and the capacity retention ratio and the thickness increasing ratio were examined. The obtained results are shown in Table 13 together with the results of Examples 1-17, 1-18, 1-27, and 1-33.

TABLE 13

|  | Cathode | Anode active material layer | Anode forming method | Penetrating portion | | | | Capacity retention ratio (%) | Thickness increasing ratio (%) |
|---|---|---|---|---|---|---|---|---|---|
|  |  |  |  | Shape | Length (%) | Width (mm) | Number |  |  |
| Example 1-17 | No groove | Si (both faces) | Vapor deposition | Slit | 70 | 0 | 1 | 84 | 14 |
| Example 1-18 |  |  |  |  |  |  | 2 | 86 | 10 |
| Example 1-27 |  |  |  | Cutout | 25 | 0.5 | 10 | 85 | 9.4 |
| Example 1-33 |  |  |  |  | 70 |  | 1 | 85.2 | 14 |
| Example 12-1 | With groove | Si (both faces) | Vapor deposition | Slit | 70 | 0 | 1 | 85.6 | 12.5 |
| Example 12-2 |  |  |  |  |  |  | 2 | 88.6 | 8.6 |
| Example 12-3 |  |  |  | Cutout | 25 | 0.5 | 10 | 88.6 | 7.8 |
| Example 12-4 |  |  |  |  | 70 |  | 1 | 89.6 | 9.6 |

As shown in Table 13, according to Examples 12-1 to 12-4, the characteristics could be improved more than in Examples 1-17, 1-18, 1-27, and 1-33. That is, it was found that when the groove was formed in at least part of the cathode active material layer 34B facing the penetrating portion, higher effects could be obtained.

Examples 13-1 to 13-8

Secondary batteries structured as shown in FIG. 1 were assembled by using the battery can 11 made of aluminum or nickel-plated iron. The anode 21 and the cathode 22 were formed in the same manner as in Examples 1-6, 1-18, 1-33, and 1-34. For the electrolytic solution, a solution obtained by dissolving 1 mol/l of $LIPF_6$ in a mixed solvent of 30 parts by weight of ethylene carbonate, 10 parts by weight of vinylene carbonate, and 60 parts by weight of dimethyl carbonate was used. Further, as Comparative examples 13-1 and 13-2 relative to Examples 13-1 to 13-8, secondary batteries were assembled in the same manner as in these examples, except that the penetrating portion was not provided.

For the fabricated secondary batteries of Examples 13-1 to 13-8 and Comparative examples 13-1 and 13-2, charge and discharge were performed in the same manner as in Examples 1-6, 1-18, 1-33, and 1-34, and the capacity retention ratio and the thickness increasing ratio were examined. The obtained results are shown in Table 14 together with the results of Examples 1-6, 1-18, 1-33, and 1-34.

13-1 and 13-2 in which the penetrating portion was not provided. Further, in the examples using the battery can 11 made of aluminum, and more particularly in the examples using the battery can 11 made of iron, the capacity retention ratio could be improved more and the thickness increasing ratio could be improved more than in the examples using the package member 40 made of the aluminum laminated film. That is, it was found that as the package, the battery can 11 was preferably used, and the iron can was more preferably used.

Examples 14-1 to 14-24

Secondary batteries were assembled in the same manner as in Examples 1-1 to 1-37, except that the shape of the battery element was the folded shape as shown in FIGS. 6A and 6B, and a package member made of an aluminum laminated film, a battery can made of aluminum, and a battery can made of nickel-plated iron were used as the package. The penetrating portion was parallel to the longitudinal direction. The length, the width, and the number of the penetrating portions were changed as shown in Table 15. As Comparative examples 14-1 and 14-2, secondary batteries were assembled in the same manner as in these examples, except that the penetrating portion was not formed.

For the fabricated secondary batteries of Examples 14-1 to 14-24 and Comparative examples 14-1 and 14-2, charge and discharge were performed in the same manner as in Examples 1-1 to 1-37, and the capacity retention ratio and the thickness

TABLE 14

| | Package | Anode active material layer | Anode forming method | Penetrating portion | | | | Capacity retention ratio (%) | Thickness increasing ratio (%) |
| | | | | Shape | Length (%) | Width (mm) | Number | | |
|---|---|---|---|---|---|---|---|---|---|
| Example 1-18 | Laminated | Si (both faces) | Vapor deposition | Slit | 70 | 0 | 2 | 86 | 10 |
| Example 1-6 | | | | | 25 | | 10 | 84 | 10 |
| Example 1-33 | | | | Cutout | 70 | 0.5 | 1 | 85.2 | 14 |
| Example 1-34 | | | | | 70 | | 2 | 87.1 | 10 |
| Example 13-1 | Aluminum can | Si (both faces) | Vapor deposition | Slit | 70 | 0 | 2 | 89 | 8 |
| Example 13-2 | | | | | 25 | | 10 | 86 | 8 |
| Example 13-3 | | | | Cutout | 70 | 0.5 | 1 | 88.5 | 6.5 |
| Example 13-4 | | | | | 70 | | 2 | 92.1 | 4.3 |
| Example 13-5 | Iron can | Si (both faces) | Vapor deposition | Slit | 70 | 0 | 2 | 91.2 | 7.5 |
| Example 13-6 | | | | | 25 | | 10 | 88.6 | 7.6 |
| Example 13-7 | | | | Cutout | 70 | 0.5 | 1 | 90.3 | 5.2 |
| Comparative example 13-1 | Aluminum can | Si (both faces) | Vapor deposition | — | — | — | — | 70 | 25 |
| Comparative example 13-2 | Iron can | | | | | | | 72 | 20 |

As shown in Table 14, in these examples, the characteristics could be improved compared to Comparative examples increasing ratio were examined. The obtained results are shown in Table 15.

TABLE 15

| | Package | Battery element shape | Anode active material layer | Penetrating portion | | | | Capacity retention ratio (%) | Thickness increasing ratio (%) |
| | | | | Shape | Length (%) | Width (mm) | Number | | |
|---|---|---|---|---|---|---|---|---|---|
| Example 14-1 | Laminated | FIG. 6A | Si (both faces) | Slit | 70 | 0 | 2 | 90 | 5 |
| Example 14-2 | | | | | 25 | | 10 | 91 | 4 |
| Example 14-3 | | | | Cutout | 70 | 0.5 | 1 | 92 | 4 |
| Example 14-4 | | | | | 70 | | 2 | 95 | 4 |
| Example 14-5 | Laminated | FIG. 6B | Si (both faces) | Slit | 70 | 0 | 2 | 91 | 4 |
| Example 14-6 | | | | | 25 | | 10 | 93 | 4 |
| Example 14-7 | | | | Cutout | 70 | 0.5 | 1 | 92 | 3.5 |
| Example 14-8 | | | | | 70 | | 2 | 94 | 3.2 |
| Example 14-9 | Aluminum can | FIG. 6A | Si (both | Slit | 70 | 0 | 2 | 91 | 3.8 |
| Example 14-10 | | | | | 25 | | 10 | 92 | 3.5 |

TABLE 15-continued

| | Package | Battery element shape | Anode active material layer | Shape | Penetrating portion Length (%) | Width (mm) | Number | Capacity retention ratio (%) | Thickness increasing ratio (%) |
|---|---|---|---|---|---|---|---|---|---|
| Example 14-11 | | | faces) | Cutout | 70 | 0.5 | 1 | 93 | 3.1 |
| Example 14-12 | | | | | 70 | | 2 | 93 | 3 |
| Example 14-13 | Iron can | FIG. 6A | Si | Slit | 70 | 0 | 2 | 93 | 3.5 |
| Example 14-14 | | | (both | | 25 | | 10 | 94 | 3.2 |
| Example 14-15 | | | faces) | Cutout | 70 | 0.5 | 1 | 95 | 3.1 |
| Example 14-16 | | | | | 70 | | 2 | 95 | 3 |
| Example 14-17 | Aluminum | FIG. 6B | Si | Slit | 70 | 0 | 2 | 93 | 3.4 |
| Example 14-18 | can | | (both | | 25 | | 10 | 92 | 3.2 |
| Example 14-19 | | | faces) | Cutout | 70 | 0.5 | 1 | 91 | 3.3 |
| Example 14-20 | | | | | 70 | | 2 | 92 | 3.1 |
| Example 14-21 | Iron can | FIG. 6B | Si | Slit | 70 | 0 | 2 | 94 | 3 |
| Example 14-22 | | | (both | | 25 | | 10 | 94 | 2.9 |
| Example 14-23 | | | faces) | Cutout | 70 | 0.5 | 1 | 95 | 2.8 |
| Example 14-24 | | | | | 70 | | 2 | 94.5 | 2.8 |
| Comparative example 14-1 | Laminated | FIG. 6A | Si (both | — | — | — | — | 70 | 39 |
| Comparative example 14-2 | Laminated | FIG. 6B | faces) | — | — | — | — | 71 | 37 |

As shown in Table 15, in Examples 14-1 to 14-24, the characteristics could be improved as well. That is, it was found that when the battery element having other structure was used, similar effects could be obtained as well.

Examples 15-1 to 15-4

Secondary batteries were assembled in the same manner as in Examples 1-1 to 1-37, except that the shape of the battery can was cylindrical and the spirally wound shape of the battery element was cylindrical. The penetrating portion was parallel to the longitudinal direction. The length, the width, and the number of the penetrating portions were changed as shown in Table 16. As Comparative example 15-1, a secondary battery was assembled in the same manner as in these examples, except that the penetrating portion was not formed.

For the fabricated secondary batteries of Examples 15-1 to 15-4 and Comparative example 15-1, charge and discharge were performed in the same manner as in Examples 1-1 to 1-37, and the capacity retention ratio and the thickness increasing ratio were examined. The obtained results are shown in Table 16.

example, in the foregoing embodiments and the foregoing examples, descriptions have been given of the case using the electrolytic solution as a liquid electrolyte or the so-called gelatinous electrolyte. However, other electrolyte may be used. As other electrolyte, a solid electrolyte having ion conductivity, a mixture of a solid electrolyte and an electrolytic solution, or a mixture of a solid electrolyte and a gelatinous electrolyte can be cited.

As a solid electrolyte, for example, a polymer solid electrolyte in which an electrolyte salt is dispersed in a polymer having ion conductivity, or an inorganic solid electrolyte formed of ion conductive glass, ionic crystal or the like can be used. As a polymer of the polymer solid electrolyte, for example, an ether polymer such as polyethylene oxide and a cross-linked body containing polyethylene oxide, an ester polymer such as poly methacrylate, or an acrylate polymer can be used singly, by mixing, or by copolymerization. As an inorganic solid electrolyte, a substance containing lithium nitride, lithium phosphate or the like can be used.

It should be understood by those skilled in the art that various modifications, combinations, sub-combinations and alternations may occur depending on design requirements and other factors insofar as they are within the scope of the appended claims or the equivalents thereof.

TABLE 16

| | Package | Anode active material layer | Shape | Penetrating portion Length (%) | Width (mm) | Number | Capacity retention ratio (%) | Thickness increasing ratio (%) |
|---|---|---|---|---|---|---|---|---|
| Example 15-1 | Cylindrical | Si | Slit | 70 | 0 | 2 | 90 | 5 |
| Example 15-2 | | (both | | 25 | | 10 | 87 | 4.2 |
| Example 15-3 | | faces) | Cutout | 70 | 0.5 | 1 | 88 | 4.1 |
| Example 15-4 | | | | 70 | | 2 | 94 | 3.5 |
| Comparative example 15-1 | Cylindrical | Si (both faces) | — | — | — | — | 70 | 21 |

As shown in Table 16, in Examples 15-1 to 15-4, the characteristics could be improved as well. That is, it was found that when the battery having other shape was used, similar effects could be obtained as well.

The invention has been described with reference to the embodiments and the examples. However, the invention is not limited to the foregoing embodiments and the foregoing examples, and various modifications may be made. For

What is claimed is:

1. An anode in which an anode active material layer containing at least one of silicon (Si) and tin (Sn) as an element is provided on both faces of a strip-shaped anode current collector, wherein,
the anode current collector and the anode active material layer include a plurality of penetrating portions effective to provide a capacity retention ratio of 79% or greater, and a thickness increasing rate of 23% or less for a battery, each penetrating portion being a cut out or a slit that penetrates the anode current collector and the anode active material layer and being formed such that a length of the penetrating portion extends primarily along a longitudinal component of the anode current collector,
a length of a longitudinal component of each penetrating portion is 25% or more of a length of the anode active material layer,
each penetrating portion is spaced from ends of the anode active material layer, and
at least a portion of the anode current collector that contacts the anode active material layer comprises a metal element alloyed with the anode active material layer.

2. The anode according to claim 1, wherein an extension direction of at least one penetrating portion is parallel to a longitudinal direction of the anode current collector, or an angle made by the extension direction of at least one penetrating portion and the longitudinal direction of the anode current collector is 60 degrees or less.

3. The anode according to claim 1, wherein the anode current collector is alloyed with the anode active material layer at least in part.

4. The anode according to claim 1, wherein at least part of the anode active material layer is formed by one or more methods selected from the group consisting of vapor-phase deposition method, spraying method, firing method, and liquid-phase deposition method.

5. The anode according to claim 1, wherein a surface roughness Ra of the anode current collector is 0.1 µm or more.

6. The anode according to claim 1, wherein the plurality of penetrating portions include a first penetrating portion and a second penetrating portion, said first penetrating portion and said second penetrating portion having different lengths.

7. An anode in which an anode active material layer containing at least one of silicon (Si) and tin (Sn) as an element is provided on both faces of a strip-shaped anode current collector,
wherein,
the anode current collector and the anode active material layer include a plurality of penetrating portions effective to provide a capacity retention ratio of 79% or greater, and a thickness increasing rate of 23% or less for a battery, each penetrating portion being a cut out or slit that penetrates the anode current collector and the anode active material layer and being formed such that a length of each penetrating portion extends primarily along a longitudinal component of the anode current collector,
a length of a longitudinal component of at least one penetrating portion is 50% or more of a length of the anode active material layer,
each penetrating portion is spaced from ends of the anode active material layer, and
at least a portion of the anode current collector that contacts the anode active material layer comprises a metal element alloyed with the anode active material layer.

8. An anode in which an anode active material layer containing at least one of silicon (Si) and tin (Sn) as an element is provided on both faces of a strip-shaped anode current collector,
wherein,
the anode current collector and the anode active material layer include a plurality of penetrating portions effective to provide a capacity retention ratio of 79% or greater, and a thickness increasing rate of 23% or less for a battery, each penetrating portion being a cut out or a slit that penetrates the anode current collector and the anode active material layer and being formed such that a length of each penetrating portion extends primarily along a longitudinal component of the anode current collector,
a length of a longitudinal component of at least one penetrating portion is 70% or more of a length of the anode active material layer,
each penetrating portion is spaced from ends of the anode active material layer, and
at least a portion of the anode current collector that contacts the anode active material layer comprises a metal element alloyed with the anode active material layer.

9. An anode in which an anode active material layer containing at least one of silicon (Si) and tin (Sn) as an element is provided on both faces of a strip-shaped anode current collector,
wherein,
the anode current collector and the anode active material layer include a plurality of penetrating portions effective to provide a capacity retention ratio of 79% or greater, and a thickness increasing rate of 23% or less for a battery, each penetrating portion being a cut out or a slit that penetrates the anode current collector and the anode active material layer and being formed such that a length of each penetrating portion extends primarily along a longitudinal component of the anode current collector,
a width of each penetrating portion is from 0.1 mm to 5 mm,
each penetrating portion is spaced from ends of the anode active material layer, and
at least a portion of the anode current collector that contacts the anode active material layer comprises a metal element alloyed with the anode active material layer.

10. A battery comprising:
a cathode;
an anode; and
an electrolyte,
wherein,
the anode has a strip-shaped anode current collector and an anode active material layer that is provided on both faces of the anode current collector and contains at least one of silicon (Si) and tin (Sn) as an element,
the anode current collector and the anode active material layer include a plurality of penetrating portions effective to provide a capacity retention ratio of 79% or greater, and a thickness increasing rate of 23% or less for the battery, each penetrating portion being a cut out or a slit that penetrates the anode current collector and the anode active material layer and being formed such that a length of each penetrating portion extends primarily along a longitudinal component of the anode current collector, the length of the longitudinal component of at least one penetrating portion is 25% or more of a length of the anode active material layer, each penetrating portion is spaced from ends of the anode active material layer, and at least a portion of the anode current collector that contacts the anode active material layer comprises a metal element alloyed with the anode active material layer.

11. The battery according to claim 10, wherein an extension direction of at least one penetrating portion is parallel to a longitudinal direction of the anode current collector, or an angle made by the extension direction of at least one penetrating portion and the longitudinal direction of the anode current collector is 60 degrees or less.

12. The battery according to claim 10, wherein the anode current collector is alloyed with the anode active material layer at least in part.

13. The battery according to claim 10, wherein at least part of the anode active material layer is formed by one or more methods selected from the group consisting of vapor-phase deposition method, spraying method, firing method, and liquid-phase deposition method.

14. The battery according to claim 10, wherein a surface roughness Ra of the anode current collector is 0.1 μm or more.

15. The battery according to claim 10, wherein
the cathode has a cathode current collector and a cathode active material layer provided on the cathode current collector, and
the cathode active material layer has a groove at least in part of a portion facing the plurality of penetrating portions.

16. The battery according to claim 10, wherein the cathode, the anode, and the electrolyte are contained inside a battery can.

17. A battery comprising:
a cathode;
an anode; and
an electrolyte,
wherein,
the anode has a strip-shaped anode current collector and an anode active material layer that is provided on both faces of the anode current collector and contains at least one of silicon (Si) and tin (Sn) as an element,
the anode current collector and the anode active material layer include a plurality of penetrating portions effective to provide a capacity retention ratio of 79% or greater, and a thickness increasing rate of 23% or less for the battery, each penetrating portion being a cut out or a slit that penetrates the anode current collector and the anode active material layer and being formed such that a length of each penetrating portion extends primarily along a longitudinal component of the anode current collector,
a length of a longitudinal component of at least one penetrating portion is 50% or more of a length of the anode active material layer,
each penetrating portion is spaced from ends of the anode active material layer, and at least a portion of the anode current collector that contacts the anode active material layer comprises a metal element alloyed with the anode active material layer.

18. A battery comprising:
a cathode;
an anode; and
an electrolyte,
wherein,
the anode has a strip-shaped anode current collector and an anode active material layer that is provided on both faces of the anode current collector and contains at least one of silicon (Si) and tin (Sn) as an element,
the anode current collector and the anode active material layer include a plurality of penetrating portions effective to provide a capacity retention ratio of 79% or greater, and a thickness increasing rate of 23% or less for the battery, each penetrating portion being a cut out or a slit to penetrate the anode current collector and the anode active material layer and being formed such that a length of each penetrating portion extends primarily along a longitudinal component of the anode current collector,
a length of a longitudinal component of at least one penetrating portion is 70% or more of a length of the anode active material layer,
each penetrating portion is spaced from ends of the anode active material layer, and
at least a portion of the anode current collector that contacts the anode active material layer comprises a metal element alloyed with the anode active material layer.

19. A battery comprising:
a cathode;
an anode; and
an electrolyte,
wherein,
the anode has a strip-shaped anode current collector and an anode active material layer that is provided on both faces of the anode current collector and contains at least one of silicon (Si) and tin (Sn) as an element,
the anode current collector and the anode active material layer include a plurality of penetrating portions effective to provide a capacity retention ratio of 79% or greater, and a thickness increasing rate of 23% or less for the battery, each penetrating portion being a cut out or a slit that penetrates the anode current collector and the anode active material layer and being formed such that a length of each penetrating portion extends primarily along a longitudinal component of the anode current collector,
a width of each penetrating portion is from 0.1 mm to 5 mm,
each penetrating portion is spaced from ends of the anode active material layer, and
at least a portion of the anode current collector that contacts the anode active material layer comprises a metal element alloyed with the anode active material layer.

* * * * *